(12) United States Patent  
Aikoh (10) Patent No.: US 11,036,056 B2  
(45) Date of Patent: Jun. 15, 2021

(54) COMPOSITE-OPTICAL-SYSTEM UNIT AND PROJECTOR

(71) Applicant: SONY CORPORATION, Tokyo (JP)

(72) Inventor: Yoshihisa Aikoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/315,946

(22) PCT Filed: Jun. 8, 2017

(86) PCT No.: PCT/JP2017/021335  
§ 371 (c)(1),  
(2) Date: Jan. 7, 2019

(87) PCT Pub. No.: WO2018/020851  
PCT Pub. Date: Feb. 1, 2018

(65) Prior Publication Data  
US 2019/0302470 A1    Oct. 3, 2019

(30) Foreign Application Priority Data

Jul. 29, 2016  (JP) .............................. JP2016-149695

(51) Int. Cl.  
*G02B 27/28*  (2006.01)  
*G03B 21/14*  (2006.01)  
(Continued)

(52) U.S. Cl.  
CPC ............. *G02B 27/283* (2013.01); *G02B 5/04* (2013.01); *G02B 7/00* (2013.01); *G03B 21/00* (2013.01);  
(Continued)

(58) Field of Classification Search  
CPC .... G03B 21/14; H04N 13/232; H04N 9/3161; F21S 2/00; G02B 27/0905;  
(Continued)

(56) References Cited

U.S. PATENT DOCUMENTS 5,028,121 A   7/1991  Baur et al.  
5,978,054 A   11/1999 Fujimori  
(Continued)

FOREIGN PATENT DOCUMENTS

JP  10-319524 A     12/1998  
JP  2001215491  *  1/2001  .............. G02B 5/30  
(Continued)

OTHER PUBLICATIONS

Machine Translation of JP 2001215491 (Year: 2019).*  
(Continued)

*Primary Examiner* — Jerry L Brooks  
(74) *Attorney, Agent, or Firm* — Oblon, McClelland, Maier & Neustadt, L.L.P.

(57) ABSTRACT

A composite-optical-system unit (40) includes a plurality of polarization beam splitters (400A, 400B, and 400C), a pair of spacer plates (420 or the like), and an optical element (411). Each of the pair of spacer plates (420) is arranged between the first polarization beam splitter (400A) and the second polarization beam splitter (400C) of the plurality of polarization beam splitters such that a first contact surface is fixed on an emission-side surface (403) of the first polarization beam splitter (400A) by surface contact, and a second contact surface is fixed on an incident-side surface (405a) of the second polarization beam splitter (400C) by surface contact. The optical element (411) is arranged between the pair of spacer plates (420).

10 Claims, 6 Drawing Sheets

(51) Int. Cl.
  *G03B 21/20* (2006.01)
  *H04N 9/31* (2006.01)
  *G03B 21/00* (2006.01)
  *G03B 33/12* (2006.01)
  *G02B 7/00* (2021.01)
  *G02B 5/04* (2006.01)
  *G03B 21/28* (2006.01)

(52) U.S. Cl.
  CPC ........... *G03B 21/005* (2013.01); *G03B 21/14* (2013.01); *G03B 21/2006* (2013.01); *G03B 21/2066* (2013.01); *G03B 21/2073* (2013.01); *G03B 21/28* (2013.01); *G03B 33/12* (2013.01); *H04N 9/3105* (2013.01); *H04N 9/3167* (2013.01)

(58) Field of Classification Search
  CPC ............. G02B 27/0933; G02B 27/0955; G02B 27/10; G02B 3/0056; G02B 5/0125; G02F 1/13
  USPC .......................................................... 353/30
  See application file for complete search history.

(56) References Cited

U.S. PATENT DOCUMENTS

| | | | |
|---|---|---|---|
| 6,010,221 A | 1/2000 | Maki et al. | |
| 6,345,895 B1 | 2/2002 | Maki et al. | |
| 2002/0024808 A1* | 2/2002 | Suehiro | G09F 13/22 362/245 |
| 2002/0063853 A1 | 5/2002 | Maki et al. | |
| 2002/0191287 A1 | 12/2002 | Miyazawa et al. | |
| 2003/0151725 A1* | 8/2003 | Hayashi | G02B 27/1026 353/31 |
| 2005/0012996 A1 | 1/2005 | Miyazawa et al. | |
| 2005/0099564 A1 | 5/2005 | Wang et al. | |
| 2005/0185305 A1 | 8/2005 | Nishima et al. | |
| 2006/0066811 A1 | 3/2006 | Sato et al. | |
| 2007/0091450 A1* | 4/2007 | Detro | H04N 9/3167 359/640 |
| 2009/0141360 A1 | 6/2009 | Koyama | |
| 2016/0116831 A1 | 4/2016 | Haga | |

FOREIGN PATENT DOCUMENTS

| | | |
|---|---|---|
| JP | 2003-233030 A | 8/2003 |
| JP | 2004-93954 A | 3/2004 |
| JP | 2005-189591 A | 7/2005 |
| JP | 2005-266763 A | 9/2005 |
| JP | 2006-259346 A | 9/2006 |
| JP | 2008-102372 A | 5/2008 |
| JP | 2009-134209 A | 6/2009 |
| JP | 2013-68774 A | 4/2013 |
| TW | 201329609 A1 | 7/2013 |
| WO | WO 95/12142 A1 | 5/1995 |
| WO | WO 2014/192794 A1 | 12/2014 |

OTHER PUBLICATIONS

International Search Report dated Sep. 5, 2017 in PCT/JP2017/021335 filed Jun. 8, 2017.
Extended European Search Report dated Jul. 4, 2019 in Patent Application No. 17833861.2, 7 pages.

* cited by examiner

COMPOSITE-OPTICAL-SYSTEM UNIT AND PROJECTOR

TECHNICAL FIELD

The present technology relates to a composite-optical-system unit and a projector including the composite-optical-system unit.

BACKGROUND ART

According to a structure of a color-separation and color-composite optical system and a manufacturing method disclosed in Patent Literature 1, four polarization beam splitters are adhered to a base stand such that a clearance is formed between the four polarization beam splitters. After that, a frame to which an optical function plate (polarization-conversion plate) is attached is inserted in the clearance. Moreover, a glue part is provided on each of four corners of the frame, and an adhesive is filled into each of the glue parts. As a result, the polarization beam splitters are attached to the frame. It is described in Patent Literature 1 that, in this manner, the optical function plate may be attached to the polarization beam splitters effectively, and optical properties of the color-separation and color-composite optical system may be maintained preferably.

CITATION LIST

Patent Literature

Patent Literature 1: Japanese Patent Application Laid-open No. 2005-266763

DISCLOSURE OF INVENTION

Technical Problem

According to the technology of Patent Literature 1, the respective polarization beam splitters are integrated by the base stand and the frame as described above. However, even in the structure including such a frame, a relative arrangement of each of the polarization beam splitters may be changed by thermal expansion when the optical system is used. As a result, desired optical properties may not be maintained.

It is an object of the present disclosure to provide a composite-optical-system unit capable of maintaining a relative position of each of a plurality of polarization beam splitters accurately and a projector including the composite-optical-system unit.

Solution to Problem

In order to attain the object, a composite-optical-system unit according to an embodiment of the present technology includes a plurality of polarization beam splitters, a pair of spacer plates, and an optical element.

Each of the plurality of polarization beam splitters includes an incident-side surface that light enters and an emission-side surface from which light is emitted.

Each of the pair of spacer plates includes a first contact surface and a second contact surface provided on a side opposite to the first contact surface. Each of the pair of spacer plates is arranged between a first polarization beam splitter and a second polarization beam splitter of the plurality of polarization beam splitters such that the first contact surface is fixed on the emission-side surface of the first polarization beam splitter by surface contact, and the second contact surface is fixed on the incident-side surface of the second polarization beam splitter by surface contact.

The optical element is arranged between the pair of spacer plates.

The spacer plates that are structured in plate shapes make a pair, and are arranged such that the first polarization beam splitter and the second polarization beam splitter contact with the contact surfaces of the spacer plates by surface contact. As a result, a stiffness of the composite-optical-system unit may be increased. Due to this, relative position accuracy of the polarization beam splitters may be maintained accurately.

Each of the pair of spacer plates may include glass.

Due to this, thermal expansion of each of the spacer plates may be suppressed to be smaller. Moreover, coefficients of thermal expansion of a glass plate and the polarization beam splitter may be the same or similar to each other, and as a result, production of a distortion of the composite-optical-system unit may be suppressed.

Each of the pair of spacer plates may include a principal surface orthogonal to a thickness direction of each of the pair of spacer plates that is provided to have a larger area than an area of each of the first contact surface and the second contact surface.

According to the present technology, a size (width) of the principal surface may be appropriately designed depending on a thickness of the optical element.

Each of the pair of spacer plates may be arranged such that a longest side of each of the pair of spacer plates is parallel to a side of each of the emission-side surface and the incident-side surface, and may be structured such that a length of the longest side of each of the pair of spacer is half or more of the side of each of the emission-side surface and the incident-side surface.

Due to this, tilting of the first polarization beam splitter and second polarization beam splitter by thermal expansion relatively from directions along the longest side of each of the first polarization beam splitter and second polarization beam splitter may be suppressed most effectively.

Each of the pair of spacer plates may be provided to be arranged such that the longest side of each of the pair of spacer plates is parallel to a longest side of each of the emission-side surface and the incident-side surface.

Each of the pair of spacer plates may be provided to be arranged such that the longest side of each of the pair of spacer plates is parallel to a side of each of the emission-side surface and the incident-side surface orthogonal to the longest side of each of the emission-side surface and the incident-side surface.

At least one of the pair of spacer plates may include a hole penetrating the principal surface.

Due to this, the hole may be used as an air hole. That is, a cooling effect of each of the parts included in the composite-optical-system unit may be increased.

At least one of the pair of spacer plates may include a plurality of plates being separated.

The composite-optical-system unit may further include a pressing member pressing and holding the optical element on the emission-side surface of the first polarization beam splitter or the incident-side surface of the second polarization beam splitter.

Due to this, an operator may remove the pressing member, easily replace the optical element, and the like when the operator performs maintenance of the composite-optical-system unit.

The optical element may be a wavelength-selective phase-difference element.

A projector according to an embodiment of the present technology includes a light source unit, a separation optical system, image generation elements, and the composite-optical-system unit described above.

The separation optical system separates light emitted from the light source unit into lights having different wavelength regions.

The image generation elements generate image lights using the lights having the different wavelength regions respectively.

The lights having the different wavelength regions separated by the separation optical system enter the composite-optical-system unit, and the composite-optical-system unit composites the image lights generated by the image generation elements respectively, Advantageous Effects of Invention As described above, according to the present technology, it is possible to maintain a relative position of each of a plurality of polarization beam splitter accurately.

Note that the effects described above are not limitative, but any effect described in the present disclosure may be produced.

MODE(S) FOR CARRYING OUT THE INVENTION

Hereinafter, embodiments according to the present technology will be described with reference to the drawings.

1. Projector

Figure 1:
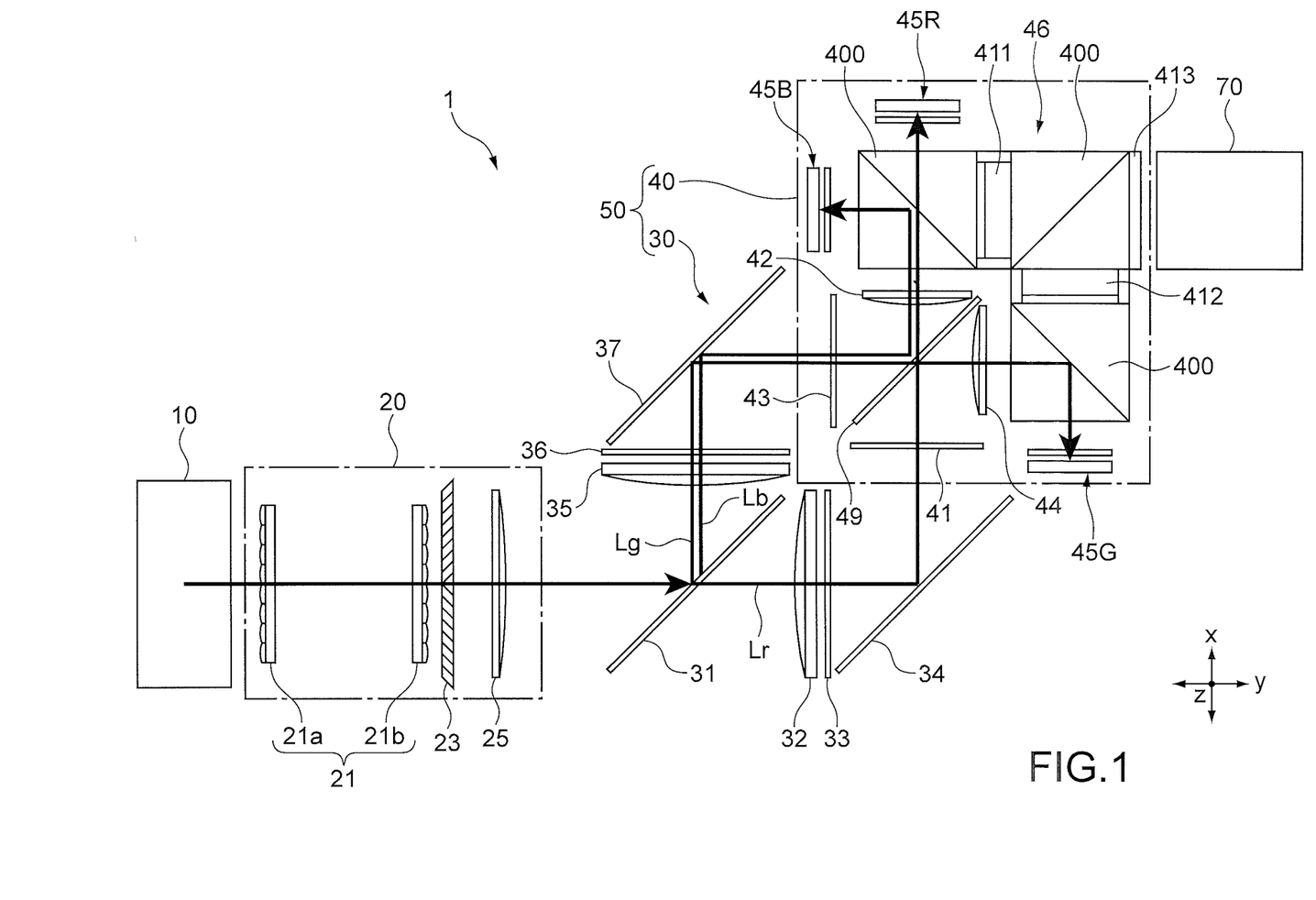
FIG. 1 is a diagram showing an optical system of a projector according to an embodiment of the present technology.

FIG. 1 is a diagram showing an optical system of a projector according to an embodiment of the present technology. A projector 1 includes a light source unit 10, a polarization-conversion unit 20, a separation-composite unit 50, and a projection unit 70.

1. 1) Light Source Unit

Although not shown, the light source unit 10 includes a laser light source and a phosphor unit, for example, and produces a white light by using the laser light source and the phosphor unit. The laser light source produces, for example, a laser having a peak wavelength of a luminescence intensity in 400 nm to 500 nm wavelength region, in other words, a blue laser light. The laser light functions as an excitation light that excites a phosphor layer provided in the phosphor unit.

The phosphor layer of the phosphor unit is excited by the excitation light from the laser light source to produce a fluorescence in a longer wavelength region than the wavelength of the excitation light. That is, the fluorescence in a longer wavelength region than the wavelength of the excitation light is a fluorescence in a wavelength region of yellow that is a mix of green and red. Moreover, the phosphor unit allows a part of the blue excitation light to pass therethrough to output a white light that has a mixed color of the blue light and the yellow fluorescence.

1. 2) Polarization-Conversion Unit

The polarization-conversion unit 20 includes an integrator element 21, a polarization-conversion element 23, a condenser lens 25, and the like, for example.

The integrator element 21 includes a pair of fly eye lenses 21a and 21b. The integrator element 21 outputs a plurality of parallel lights that have brightness unified by many micro-lenses which the fly eye lenses 21a and 21b include. The polarization-conversion element 23 has a function of converting one polarization (for example, p-polarization) included in an incident light from the integrator element 21 to the other polarization (for example, s-polarization) to unify the polarization. The light emitted from the polarization-conversion element 23 enters the separation-composite unit 50 via the condenser lens.

1. 3) Separation-Composite Unit

The separation-composite unit 50 includes a separation-optical-system unit 30 and a composite-optical-system unit 40.

The separation-optical-system unit 30 includes a dichroic mirror 31 provided on an incident side, two condenser lenses 32 and 35, two polarization filters 33 and 36, and two mirrors 34 and 37. In order to realize higher brightness of a projected image, the polarization filters 33 and 36 have a function of decreasing thermal loads of polarization elements 41 and 43 in the downstream. If it is not necessary to increase brightness, the polarization filters 33 and 36 are also not needed. For example, a wire grid, a ½ waveplate, and the like are used as structures of the polarization filters 33 and 36.

The dichroic mirror 31 allows a red (R) light Lr of lights emitted from the polarization-conversion unit 20 to pass therethrough, and reflects a green (G) light Lg and a blue (B) light Lb of the lights emitted from the polarization-conversion unit 20. The R light Lr enters the composite-optical-system unit 40 via the condenser lens 32, the polarization filter 33, and the mirror 34. Similarly, the G light Lg and the B light Lb enter the composite-optical-system unit 40 via the condenser lens 35, the polarization filter 36, and the mirror 37.

1. 4) Composite-Optical-System Unit

The lights (each of the R, G, and B lights) having different wavelength regions separated by the separation-optical-system unit 30 enter the composite-optical-system unit 40, and the composite-optical-system unit 40 has a function of compositing image lights generated by image generation units 45R, 45G, and 45B respectively. For example, the composite-optical-system unit 40 includes the polarization filter 41, a dichroic mirror 49, field lenses 42 and 44, a core unit 46, and the image generation units 45R, 45G, and 45B for each of the R, G, and B lights.

For example, the polarization filter 41 includes a wire grid element, but not limited. The dichroic mirror allows the B light Lb to pass therethrough, and reflects the R light Lr and the G light Lg.

Figure 2:
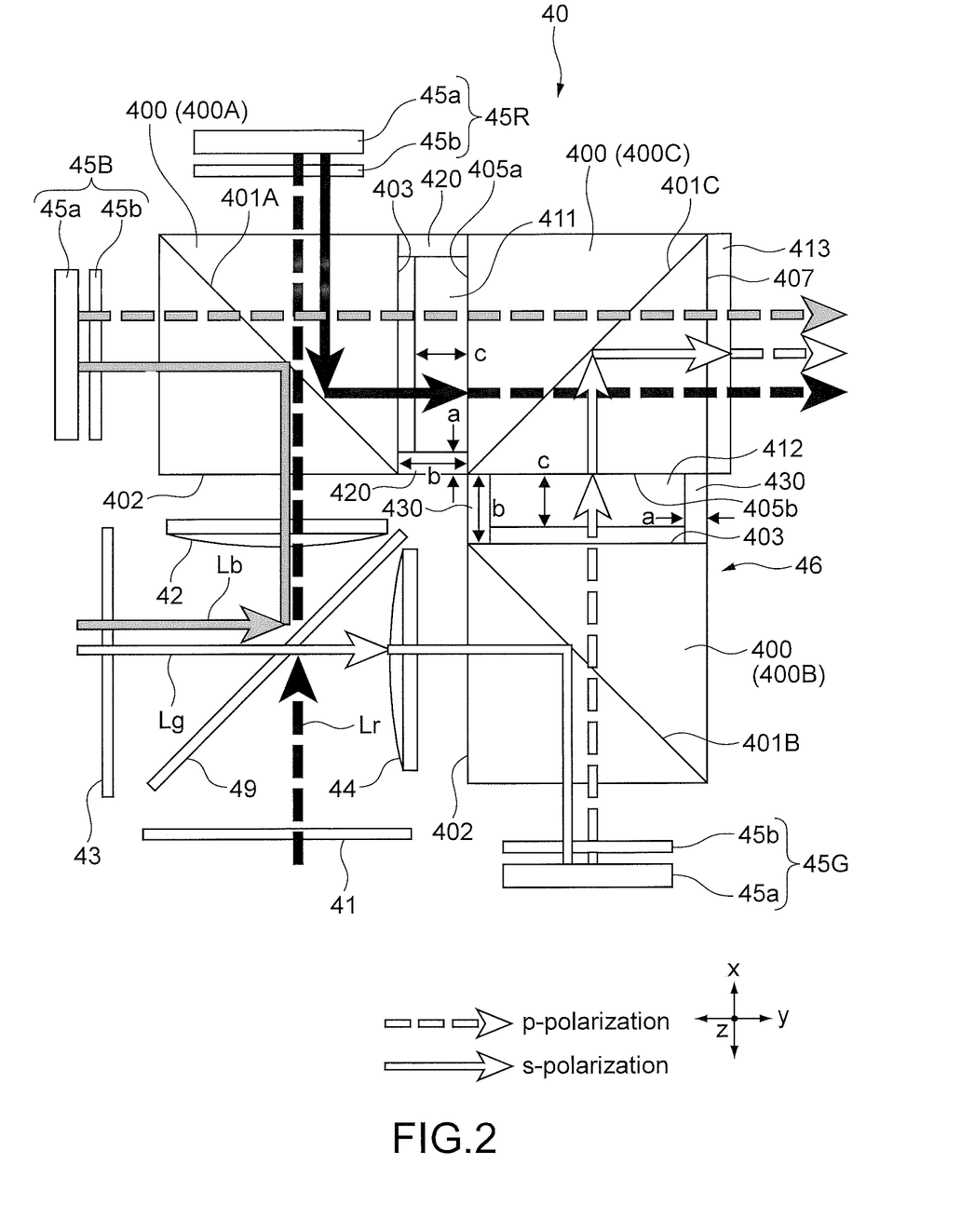
FIG. 2 shows a structure of a composite-optical-system unit of the optical system of FIG. 1.

FIG. 2 shows a structure of the composite-optical-system unit 40 of the optical system of FIG. 1. The core unit 46 includes a plurality of polarization beam splitters (PBSs) 400, in the present embodiment, three PBSs 400. The three PBSs 400 function as a first polarization beam splitter, a second polarization beam splitter, and a third polarization beam splitter respectively.

In a plan view (in FIG. 2, seen in the z-direction), for example, the three PBSs 400 are arranged such that respective polarization-separation films 401A, 401B, and 401C are in the T shape as a whole, and the entire core unit 46 is in the L shape.

For example, the core unit 46 includes two incident-side PBSs 400A and 400B, and one emission-side PBS 400C. The core unit 46 includes a pair of spacer plates 420 arranged between an emission-side surface 403 of the incident-side PBS 400A and an incident-side surface 405a of the emission-side PBS 400C. Furthermore, the core unit 46 includes a pair of spacer plates 430 arranged between the emission-side surface 403 of the incident-side PBS 400B and an incident-side surface 405b of the emission-side PBS 400C. Gaps are formed between the respective PBSs 400 by the pair of spacer plates 420 (430).

Wavelength-selective phase-difference elements 411 and 412 (optical elements) are arranged in the gaps respectively. The wavelength-selective phase-difference element 411 or 412 is also arranged on an emission-side surface 407 of the emission-side PBS 400C.

The field lenses 42 and 44 are arranged between incident-side surfaces 402 of the two incident-side PBSs 400A and 400B and the dichroic mirror 49 respectively.

Each of the image generation units 45R, 45G, and 45B includes an image generation element 45a that is reflective-type and an optical compensation element 45b. The image generation element 45a is a liquid-crystal device that is reflective-type, for example. The image generation element 45a is not limited to the liquid-crystal device, but may be a display element using a digital-micro-mirror. The image generation units 45R and 45B are arranged along two side surfaces (side surfaces other than the incident-side surface 402 and the emission-side surface 403) of the incident-side PBS 400A respectively. The image generation unit 45G is arranged along one side surface (side surface other than the incident-side surface 402 and the emission-side surface 403) of the incident-side PBS 400B. For example, a ¼ waveplate is used as the optical compensation element 45b.

A detailed structure of the core unit 46 will be described below.

P-polarized component of the R light Lr entering the incident-side PBS 400A passes through the polarization-separation film 401A, and enters the image generation unit 45R. The image generation unit 45R outputs an s-polarized red image light (R image light) on the basis of a received light, and returns the s-polarized R image light back to the incident-side PBS 400A. The returned s-polarized R image light is reflected by the polarization-separation film 401A, and enters the wavelength-selective phase-difference element 411.

S-polarized component of the B light Lb entering the incident-side PBS 400A is reflected by the polarization-separation film 401A, and enters the image generation unit 45B. The image generation unit 45B outputs a p-polarized blue image light (B image light) on the basis of the received light, and returns the p-polarized B image light back to the incident-side PBS 400A. The returned p-polarized B image light passes through the polarization-separation film 401A, and enters the wavelength-selective phase-difference element 411.

S-polarized component of the G light Lg entering the incident-side PBS 400B is reflected by the polarization-separation film 401B, and enters the image generation unit 45G. The image generation unit 45G outputs a p-polarized green image light (G image light) on the basis of the received light, and returns the p-polarized G image light back to the incident-side PBS 400B. The returned s-polarized G image light passes through the polarization-separation film 401B, and enters the wavelength-selective phase-difference element 412.

The s-polarized R image light is converted to a p-polarized light by the wavelength-selective phase-difference element 411, passes through the emission-side PBS 400C and a wavelength-selective phase-difference element 413, and enters the projection unit 70 (See FIG. 1). Moreover, the p-polarized B image light passes through the wavelength-selective phase-difference element 411, the emission-side PBS 400C, and the wavelength-selective phase-difference element 413, and enters the projection unit 70.

The p-polarized G image light is converted to an s-polarized light by the wavelength-selective phase-difference element 412, and reflected by the polarization-separation film 401C of the emission-side PBS 400C. Then, the G image light is converted to a p-polarized light by the wavelength-selective phase-difference element 413, and enters the projection unit 70.

The projection unit 70 mainly includes a projection lens that is not shown, and projects an incident light.

Figure 3:
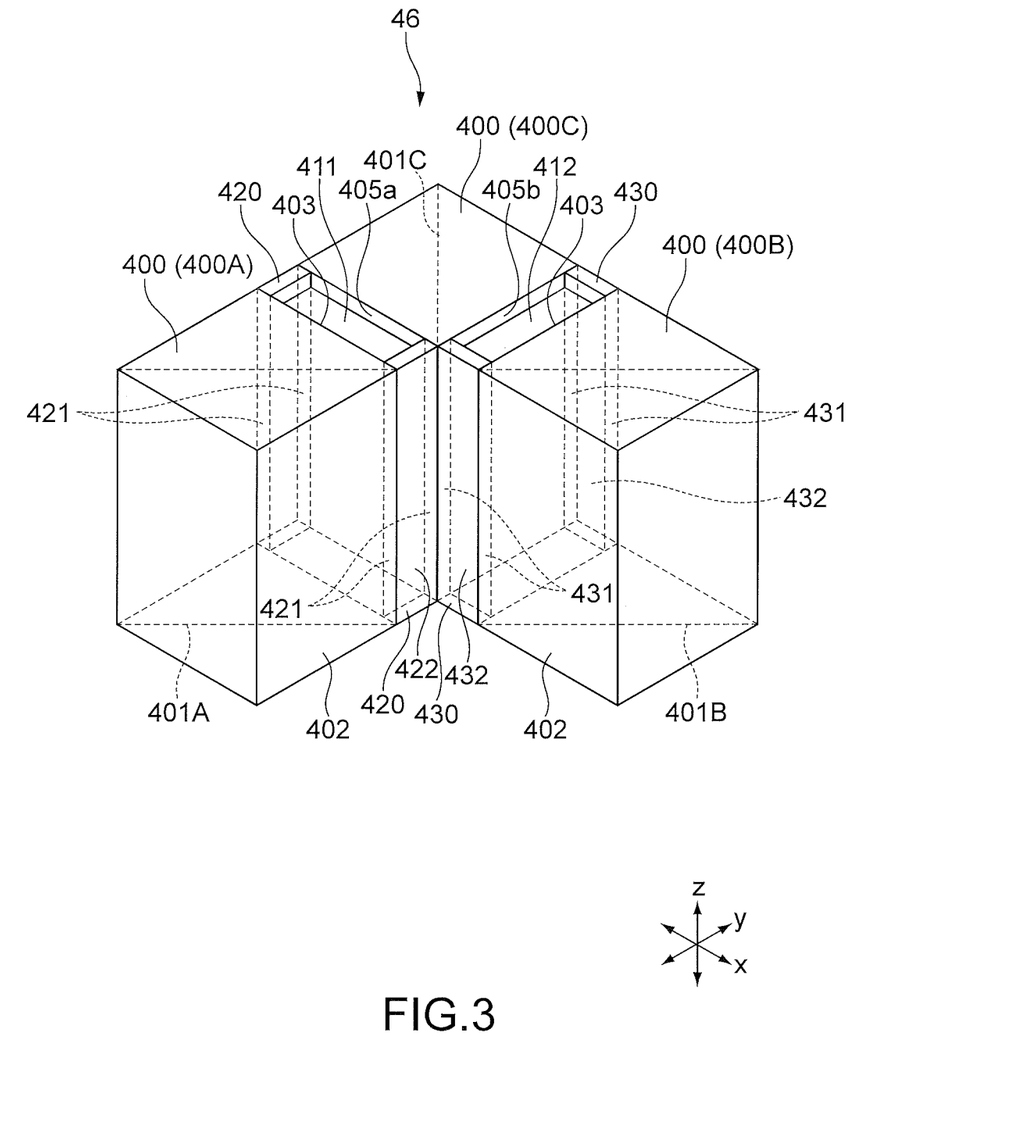
FIG. 3 is a perspective view showing the composite-optical-system unit (core unit).

FIG. 3 is a perspective view showing the composite-optical-system unit 40 (core unit 46). The three PBSs 400 are structured in the same rectangular parallelepiped shapes, for example. The pair of spacer plates 420 are structured in rectangular parallelepiped shapes respectively, and include a principal surface 422 and contact surfaces (first contact surface and second contact surface) 421. The contact surfaces 421 contact with the emission-side surface 403 of the PBS 400A and the incident-side surface 405a of the emission-side PBS 400C, and are fixed on the emission-side surface 403 of the PBS 400A and the incident-side surface 405a of the emission-side PBS 400C by an adhesive. As a result, the pair of spacer plates 420 are fixed on the two PBSs 400A and 400C.

The pair of spacer plates 430 that are adhered and fixed between the incident-side PBS 400B (emission-side surface 403) and the emission-side PBS 400C (incident-side surface 405b) also have the similar structures to the structures of the pair of spacer plates 420. That is, each of the spacer plates 430 includes contact surfaces 431 that contact with the incident-side PBS 400B and the emission-side PBS 400C, and principal surfaces 432 orthogonal to the contact surfaces 431.

For example, an area of the principal surface 422 of the spacer plate 420 is larger than an area of each of the contact surfaces 421. That is, the spacer plates 420 are provided between the incident-side PBS 400A and the emission-side PBS 400C in an attitude in which the principal surface 422 is arranged orthogonally to the x-direction (in which a direction of a thickness a (See FIG. 2) of each of the spacer plates 420 is the x-direction). Similarly, the spacer plates 430 are provided between the incident-side PBS 400B and the emission-side PBS 400C in an attitude in which the principal surface 432 is arranged orthogonally to the y-direction (in which a direction of a thickness a of each of the spacer plates 430 is the y-direction). A designer may appropriately design the sizes (widths b in FIG. 2) of the principal surfaces 422 and 432 depending on thicknesses of the wavelength-selective phase-difference elements 411 and 412 arranged in the gaps.

As shown in FIG. 2, a thickness c of the wavelength-selective phase-difference element 411 is designed to be smaller than a width b of the principal surface 422 of the spacer plates 420. Similarly, a thickness (thickness in the x-direction) c of the wavelength-selective phase-difference element 412 is designed to be smaller than a width b of the principal surface 432 of the spacer plates 430. The reason that the wavelength-selective phase-difference elements 411 and 412 are structured in such structures is that the wavelength-selective phase-difference elements 411 and 412 may be replaced with each other.

Note that, in a design in which the wavelength-selective phase-difference elements may not be replaced with each other, each of the thicknesses of the wavelength-selective phase-difference elements 411 and 412 may be designed to be substantially the same as each of the widths of the principal surfaces 422 and 432.

As described above, the spacer plates 420 (430) that are structured in plate shapes make a pair, and are arranged such that the emission-side surface 403 of the incident-side PBS 400A (400B) and the incident-side surface 405a (405b) of the emission-side PBS 400C contact with the contact surfaces 421 (431) of the spacer plates 420 (430) by surface contact. By such a structure, a stiffness of the composite-optical-system unit 40 may be increased. Due to this, relative position accuracy of the PBSs 400 (polarization-separation films) may be maintained accurately, and a desired optical property may be maintained.

Moreover, the structure according to the present embodiment including the pair of spacer plates 420 (430) is simpler than a structure of Patent Literature 1 in which a base stand and a frame support and couple a polarization beam splitter, and may realize the composite-optical-system unit 40 having high stiffness.

The spacer plates 420 and 430 are composed of glass that is the same or similar to a material of the prisms of the PBSs 400. Due to this, thermal expansion of the spacer plates 420 and 430 may be suppressed to be smaller. Moreover, coefficients of thermal expansion of the spacer plates 420 and 430, and the PBSs 400 may be the same or similar to each other, and as a result, production of a distortion of the composite-optical-system unit 40 may be suppressed.

In FIG. 3, the longest side of each of the spacer plates 420 (430) is a side along the z-direction. Each of the longest sides is arranged to be parallel to a side (specifically, the longest side that is a side in the z-direction) of each of the emission-side surfaces 403 and the incident-side surface 405a (405b) of the PBSs 400. Moreover, a length of the longest side of each of the spacer plates 420 (430) is structured to be half or more of the side of each of the emission-side surfaces 403 and the incident-side surface 405a (405b). In the present embodiment, the length of each of the spacer plates 420 (430) in the z-direction is substantially the same as a length of the side of each of the PBSs 400 in the z-direction.

By such a structure, tilting by thermal expansion of the two PBSs 400 that are on either end of the pair of spacer plates 420 (430) relatively from directions (z-direction) along the longest side of each of the spacer plates 420 (430) may be suppressed most effectively.

Figure 4:
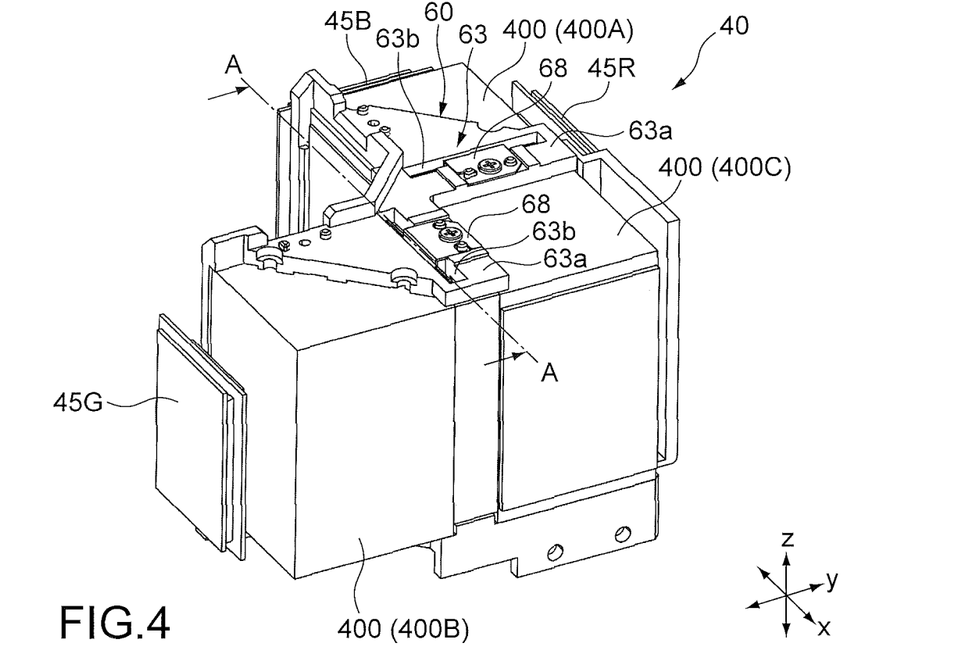
FIG. 4 is a perspective view showing an example of the composite-optical-system unit to which a housing base is attached.
Figure 5:
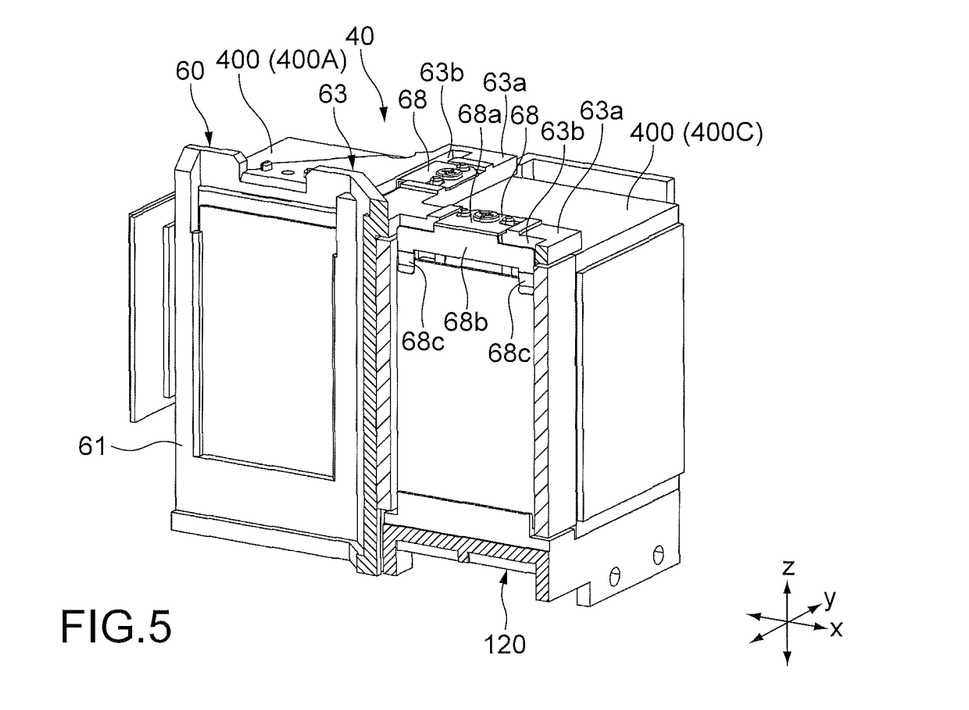
FIG. 5 is a cross-sectional view along A-A line along the x-direction of FIG. 4.

FIG. 4 is a perspective view showing an example of the composite-optical-system unit 40 to which a housing base 60 is attached. FIG. 5 is a cross-sectional view along A-A line along the x-direction of FIG. 4.

The housing base 60 includes a frame part 61 and an upper plate part 63. The frame part 61 is attached along the incident-side surface 402 of the incident-side PBSs 400A and 400B to surround the incident-side surface 402. The upper plate part 63 is provided mainly on an upper surface part of the incident-side PBSs 400A and 400B. In a plan view (seen in the z-direction), the upper plate part 63 is in a butterfly shape. The upper plate part 63 includes attachment parts 63a to which leaf springs (pressing members) 68 are attached and slits 63b. The one attachment part 63a and the one slit 63b are provided on an upper part between the incident-side PBS 400A and the emission-side PBS 400C. The other attachment part 63a and the other slit 63b are provided on an upper part between the incident-side PBS 400B and the emission-side PBS 400C.

As shown in FIG. 5, the leaf spring 68 includes a fixation part 68a and a pressing plate part 68b, and the fixation part 68a and the pressing plate part 68b form the substantially L shape. The fixation part 68a is fixed on the attachment part 63a by a screw, and the pressing plate part 68b is inserted in a gap via the slit 63b of the upper plate part 63. Pressing pieces 68c are provided to protrude on lower ends of the pressing plate part 68b. The wavelength-selective phase-difference elements 411 and 412 are pressed and held on the incident-side surfaces 405a and 405b of the emission-side PBS 400C by the leaf springs 68 respectively.

Note that lower end parts of the wavelength-selective phase-difference elements 411 and 412 contact with cap members 120 arranged on lower parts of the wavelength-selective phase-difference elements 411 and 412 and are supported by the cap members 120.

According to such structures of the housing base 60 and the leaf springs 68, for example, an operator may remove the leaf springs 68 and the housing base 60, easily replace the wavelength-selective phase-difference elements 411 and 412, and the like when the operator performs maintenance of the composite-optical-system unit 40.

2. Examples of Spacer Plate or Composite-Optical-System Unit According to Other Embodiments Next, spacer plates or composite-optical-system units according to other embodiments of the present technology will be described. Hereinafter, the same reference symbols are attached to the substantially similar elements to the members, the functions, and the like of the composite-optical-system unit 40 or the core unit 46 according to the first embodiment and the like. Besides, the descriptions of those are omitted or simplified, and different points are mainly described.

2. 1) Example 1

Figure 6:
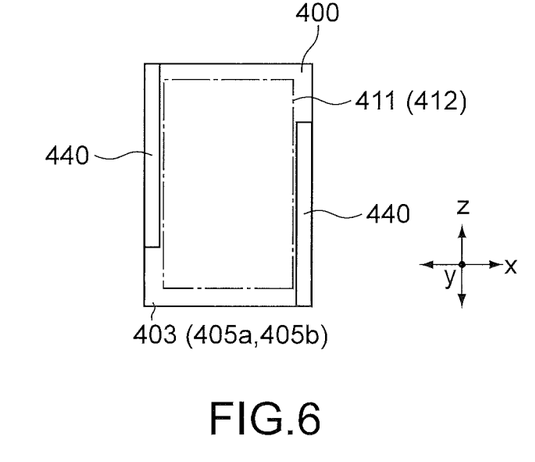
FIG. 6 is a side view showing a part of the composite-optical-system unit and a pair of spacer plates according to another example.

FIG. 6 is a side view showing a part of the composite-optical-system unit 40, for example, the emission-side surface 403 (or the incident-side surface 405a (405b) of the emission-side PBS 400C) of the incident-side PBS 400A and a pair of spacer plates. A length of each of the pair of spacer plates 440 in the z-direction is shorter and half or more than a length of each of side surfaces of the PBS 400 in the z-direction. The one spacer plate 440 contacts with and is fixed on the one side surface of the PBS 400 such that, for example, an upper end position of the one spacer plate 440 coincides with an upper end position of the PBS 400. The other spacer plate 440 contacts with and is fixed on the other side surface of the PBS 400 such that, for example, a lower end position of the other spacer plate 440 coincides with a lower end position of the PBS 400.

According to such a structure, not only top surfaces and lower surfaces, but also the side surfaces of the wavelength-selective phase-difference elements 411 and 412 may be exposed to outside air of the composite-optical-system unit 40 (core unit 46). Due to this, the wavelength-selective phase-difference elements 411 and 412 may be cooled effectively. Moreover, a cooling effect of the incident-side surface (emission-side surface) of the PBS 400 may be increased.

2. 2) Example 2

Figure 7:
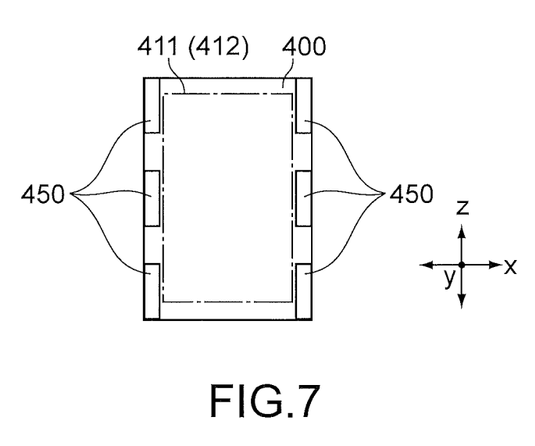
FIG. 7 is a diagram showing a PBS and a pair of spacer plates according to still another example.

Similarly to FIG. 6, FIG. 7 is a diagram showing the side surface of the PBS 400 and a pair of spacer plates. In this example, each of the pair of spacer plates 450 is structured to be separated into a plurality of pieces in a length direction of each of the pair of spacer plates 450. In FIG. 7, the number of the separated pieces is three. However, the number of the separated pieces may be two, or four or more. Separation positions of the one spacer plate 450 in the z-direction may be different from separation positions of the other spacer plate 450. According to the structure, the wavelength-selective phase-difference elements 411 and 412 may be cooled effectively.

2. 3) Example 3

Figure 8:
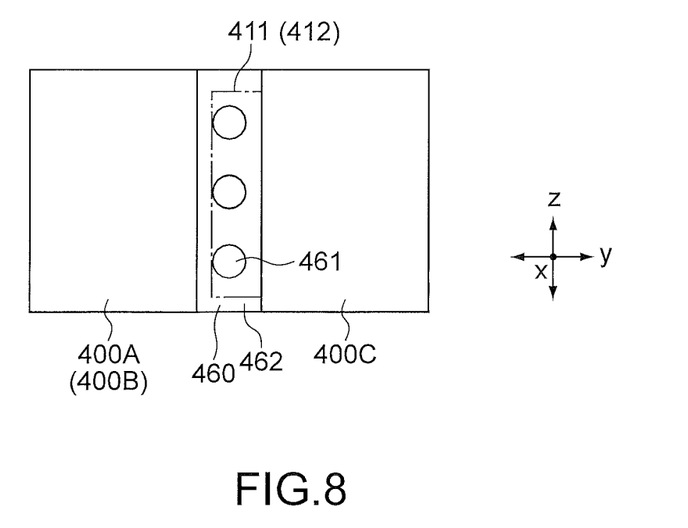
FIG. 8 is a diagram showing PBSs and a pair of spacer plates according to still another example.

FIG. 8 is a diagram showing exterior side surfaces of the two PBSs 400 and a pair of spacer plates. Each of the pair of spacer plates 460 includes one or a plurality of (three in FIG. 8) through-holes 461 provided on each of principal surfaces 462. The through-holes 461 may be used as air holes, and may increase a cooling effect.

2. 4) Example 4

Figure 9:
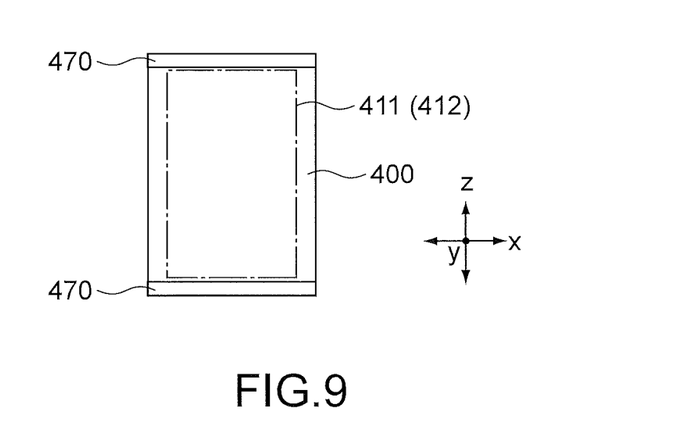
FIG. 9 is a diagram showing a PBS and a pair of spacer plates according to still another example.

Similarly to FIGS. 6 and 7, FIG. 9 is a diagram showing the emission-side surface or the incident-side surface of the PBS 400 and a pair of spacer plates. In this example, the pair of spacer plates 470 are arranged in the z-direction to be parallel to a side (a side in the horizontal direction) of the emission-side surface or the incident-side surface orthogonal to the longest side of the emission-side surface or the incident-side surface. In this case, the wavelength-selective phase-difference elements 411 and 412 are inserted and taken out in the horizontal direction (for example, the x-direction) when replacement operation is performed.

Similarly to the examples of FIGS. 6 to 8, the example of FIG. 9 may be appropriately changed.

3. Various Other Embodiments

The present technology is not limited to the embodiment described above, and the present technology may realize various other embodiments.

A material of each of the spacer plates 420, 430, 440, 450, 460, and 470 is glass. However, another material having a coefficient of thermal expansion that is similar to the coefficient of thermal expansion of glass may be used. Examples of the material include SUS430, Kovar, 42alloy, and the like, for example.

According to the embodiment, each of the wavelength-selective phase-difference elements 411 and 412 is held by the pressing member (leaf spring 68) such that each of the wavelength-selective phase-difference elements 411 and 412 contacts with the incident-side surface 405a (405b) of the emission-side PBS 400C. However, each of the wavelength-selective phase-difference elements 411 and 412 may be held by the pressing member on the emission-side surface 403 of each of the incident-side PBSs 400A and 400B.

According to the embodiment, each of the pair of spacer plates 420 provided between the two PBSs 400 has a structure in which each of the contact surfaces 421 contacting with the two PBSs 400 has a smaller area than the area of the surface (according to the embodiment, the principal surface 422) orthogonal to the contact surfaces 421. However, each of the pair of spacer plates may have a structure in which each of the contact surfaces has a larger area than the area of the surface orthogonal to the contact surfaces.

The PBSs 400 according to the embodiment are structured in the rectangular parallelepiped shapes. However, the shape of each of the PBSs 400 may be a regular hexahedron.

According to the embodiment, the PBSs 400 are structured in the rectangular parallelepiped shapes, and the longest sides of the PBSs 400 are arranged along the z-direction. However, the longest sides of the PBSs 400 may be arranged along the x-direction or the y-direction, for example.

At least two of the features of the other embodiments described above may also be combined.

Note that the present technology may also employ the following configurations.

(1)

A composite-optical-system unit, including:

a plurality of polarization beam splitters, each of the plurality of polarization beam splitters including an incident-side surface that light enters and an emission-side surface from which light is emitted;

a pair of spacer plates, each of the pair of spacer plates including a first contact surface and a second contact surface provided on a side opposite to the first contact surface, each of the pair of spacer plates being arranged between a first polarization beam splitter and a second polarization beam splitter of the plurality of polarization beam splitters such that the first contact surface is fixed on the emission-side surface of the first polarization beam splitter by surface contact, and the second contact surface is fixed on the incident-side surface of the second polarization beam splitter by surface contact; and an optical element arranged between the pair of spacer plates.

(2)

The composite-optical-system unit according to (1), in which each of the pair of spacer plates includes glass.

(3)

The composite-optical-system unit according to (1) or (2), in which each of the pair of spacer plates includes a principal surface orthogonal to a thickness direction of each of the pair of spacer plates that is provided to have a larger area than an area of each of the first contact surface and the second contact surface.

(4)

The composite-optical-system unit according to any one of (1) to (3), in which each of the pair of spacer plates is arranged such that a longest side of each of the pair of spacer plates is parallel to a side of each of the emission-side surface and the incident-side surface, and is structured such that a length of the longest side of each of the pair of spacer is half or more of the side of each of the emission-side surface and the incident-side surface.

(5)

The composite-optical-system unit according to (4), in which each of the pair of spacer plates is provided to be arranged such that the longest side of each of the pair of spacer plates is parallel to a longest side of each of the emission-side surface and the incident-side surface.

(6)

The composite-optical-system unit according to (4), in which each of the pair of spacer plates is provided to be arranged such that the longest side of each of the pair of spacer plates is parallel to a side of each of the emission-side surface and the incident-side surface orthogonal to the longest side of each of the emission-side surface and the incident-side surface.

(7)

The composite-optical-system unit according to (3), in which at least one of the pair of spacer plates includes a hole penetrating the principal surface.

(8)

The composite-optical-system unit according to any one of (1) to (7), in which at least one of the pair of spacer plates includes a plurality of plates being separated.

(9)

The composite-optical-system unit according to any one of (1) to (8), further including a pressing member pressing and holding the optical element on the emission-side surface of the first polarization beam splitter or the incident-side surface of the second polarization beam splitter.

(10)

The composite-optical-system unit according to any one of (1) to (9), in which the optical element is a wavelength-selective phase-difference element.

(11)

A projector, including:

a light source unit;

a separation optical system that separates light emitted from the light source unit into lights having different wavelength regions;

image generation elements that generate image lights using the lights having the different wavelength regions respectively; and a composite-optical-system unit, the lights having the different wavelength regions separated by the separation optical system entering the composite-optical-system unit, the composite-optical-system unit being configured to composite the image lights generated by the image generation elements respectively, the composite-optical-system unit including a plurality of polarization beam splitters, each of the plurality of polarization beam splitters including an incident-side surface that light enters and an emission-side surface from which light is emitted, a pair of spacer plates, each of the pair of spacer plates including a first contact surface and a second contact surface provided on a side opposite to the first contact surface, each of the pair of spacer plates being arranged between a first polarization beam splitter and a second polarization beam splitter of the plurality of polarization beam splitters such that the first contact surface is fixed on the emission-side surface of the first polarization beam splitter by surface contact, and the second contact surface is fixed on the incident-side surface of the second polarization beam splitter by surface contact, and an optical element arranged between the pair of spacer plates.

REFERENCE SIGNS LIST 1 projector
10 light source unit
20 polarization-conversion unit
30 separation-optical-system unit
40 composite-optical-system unit
45R, 45G, 45B image generation unit
45a image generation element
45b optical compensation element
46 core unit
50 separation-composite unit
60 housing base
70 projection unit
400 PBS
400A, 400B incident-side PBS
400C emission-side PBS
402, 405a, 405b incident-side surface
403 emission-side surface
411, 412 wavelength-selective phase-difference element
420, 430, 440, 450, 460, 470 spacer plate
421, 431 contact surface

The invention claimed is:

1. A composite-optical-system unit, comprising:

a plurality of polarization beam splitters, each of the plurality of polarization beam splitters including an incident-side surface that light enters and an emission-side surface from which light is emitted;

a pair of spacer plates spaced apart and out of contact with each other to provide a gap between the pair of spacer plates, each of the pair of spacer plates including a first contact surface and a second contact surface provided on a side opposite to the first contact surface, each of the pair of spacer plates being arranged between a first polarization beam splitter and a second polarization beam splitter of the plurality of polarization beam splitters such that the first contact surface is fixed on the emission-side surface of the first polarization beam splitter by surface contact, and the second contact surface is fixed on the incident-side surface of the second polarization beam splitter by surface contact; and an optical element arranged in the gap between the pair of spacer plates, wherein a longest side of each of the pair of spacer plates is oriented in a direction orthogonal to a plane where the first polarization beam splitter and the second polarization beam splitter are arrange, and wherein each of the pair of spacer plates is arranged such that the longest side of each of the pair of spacer plates is parallel to a longest side of each of the emission-side surface of the first polarization beam splitter and the incident-side surface of the second polarization beam splitter, and is structured such that a length of the longest side of each of the pair of spacer plates is half or more of the side of each of the emission-side surface and the incident-side surface.

2. The composite-optical-system unit according to claim 1, wherein
each of the pair of spacer plates includes glass.

3. The composite-optical-system unit according to claim 1, wherein
each of the pair of spacer plates includes a principal surface orthogonal to a thickness direction of each of the pair of spacer plates that is provided to have a larger area than an area of each of the first contact surface and the second contact surface.

4. The composite-optical-system unit according to claim 3, wherein
at least one of the pair of spacer plates includes a hole penetrating the principal surface.

5. The composite-optical-system unit according to claim 1, wherein
at least one of the pair of spacer plates includes a plurality of plates being separated.

6. The composite-optical-system unit according to claim 1, further comprising
a pressing member pressing and holding the optical element on the emission-side surface of the first polarization beam splitter or the incident-side surface of the second polarization beam splitter.

7. The composite-optical-system unit according to claim 1, wherein
the optical element is a wavelength-selective phase-difference element.

8. A projector, comprising:
a light source unit;
a separation optical system that separates light emitted from the light source unit into lights having different wavelength regions;
image generation elements that generate image lights using the lights having the different wavelength regions respectively; and
a composite-optical-system unit, the lights having the different wavelength regions separated by the separation optical system entering the composite-optical-system unit, the composite-optical-system unit being configured to composite the image lights generated by the image generation elements respectively,
the composite-optical-system unit including
a plurality of polarization beam splitters, each of the plurality of polarization beam splitters including an incident-side surface that light enters and an emission-side surface from which light is emitted,
a pair of spacer plates spaced apart and out of contact with each other to provide a gap between the pair of spacer plates, each of the pair of spacer plates including a first contact surface and a second contact surface provided on a side opposite to the first contact surface, each of the pair of spacer plates being arranged between a first polarization beam splitter and a second polarization beam splitter of the plurality of polarization beam splitters such that the first contact surface is fixed on the emission-side surface of the first polarization beam splitter by surface contact, and the second contact surface is fixed on the incident-side surface of the second polarization beam splitter by surface contact, and
an optical element arranged in the gap between the pair of spacer plates,
wherein a longest side of each of the pair of spacer plates is oriented in a direction orthogonal to a plane where the first polarization beam splitter and the second polarization beam splitter are arranged, and
wherein each of the pair of spacer plates is arranged such that the longest side of each of the pair of spacer plates is parallel to a longest side of each of the emission-side surface of the first polarization beam splitter and the incident-side surface of the second polarization beam splitter, and is structured such that a length of the longest side of each of the pair of spacer plates is half or more of the side of each of the emission-side surface and the incident-side surface.

9. The composite-optical-system unit according to claim 1, wherein a length of a longest side of the first contact surface is a same length as a length of a side of the first polarization beam splitter in contact with the first contact surface, and
wherein a length of a longest side of the second contact surface is a same length as a length of a side of the second polarization beam splitter in contact with the second contact surface.

10. The projector according to claim 8, wherein a length of a longest side of the first contact surface is a same length as a length of a side of the first polarization beam splitter in contact with the first contact surface, and
wherein a length of a longest side of the second contact surface is a same length as a length of a side of the second polarization beam splitter in contact with the second contact surface.

* * * * *